United States Patent [19]
Turner et al.

[11] 3,929,639
[45] Dec. 30, 1975

[54] FILTERING APPARATUS AND PROCESS

[75] Inventors: James Keith Turner, Lincolnton; Gary L. Parsons, Gastonia, both of N.C.

[73] Assignee: Gaston County Dyeing Machine Company, Mount Holly, N.C.

[22] Filed: July 23, 1973

[21] Appl. No.: 381,798

[52] U.S. Cl. .................... 210/71; 68/18 F; 210/81; 210/181; 210/197; 210/304; 210/333; 210/341; 210/512 M
[51] Int. Cl.² .......................................... B01D 35/22
[58] Field of Search ........... 68/18 F, 18 R; 209/211, 209/10, 17, 250; 210/71, 74, 76, 78, 81, 84, 181, 182, 340, 341, 414, 512 M, 512 R, 194, 197, 304, 333

[56] References Cited
UNITED STATES PATENTS

| | | | |
|---|---|---|---|
| 1,575,907 | 3/1926 | Genter | 210/340 X |
| 1,910,979 | 5/1933 | Applebaum | 210/181 X |
| 2,610,698 | 9/1952 | Lovelady et al. | 210/512 R |
| 2,678,133 | 5/1954 | Thayer et al. | 210/304 X |
| 2,754,968 | 7/1956 | Vegter et al. | 210/197 |
| 2,967,618 | 1/1961 | Vane | 210/512 R |
| 3,061,098 | 10/1962 | Brezinski | 209/211 |
| 3,067,876 | 12/1962 | Hruby, Jr. | 210/512 R |
| 3,186,513 | 6/1965 | Dunn et al. | 210/512 R |
| 3,207,310 | 9/1965 | Yesberger | 210/512 M |
| 3,235,090 | 2/1966 | Bose et al. | 210/512 R |
| 3,392,114 | 7/1968 | Delcellier | 210/84 X |
| 3,392,835 | 7/1968 | Asper | 210/197 X |
| 3,394,809 | 7/1968 | Hunter | 210/304 X |
| 3,530,993 | 9/1970 | Fulton | 210/304 X |
| 3,543,932 | 12/1970 | Rastatter | 210/512 M |
| 3,718,258 | 2/1973 | Sharpe | 210/304 |
| 3,727,435 | 4/1973 | Menk | 68/18 F |
| 3,807,568 | 4/1974 | Ruthrof | 210/304 |

*Primary Examiner*—Frank A. Spear, Jr.
*Assistant Examiner*—Robert G. Mukai
*Attorney, Agent, or Firm*—Richards, Shefte & Pinckney

[57] ABSTRACT

A filtering system is provided by which contaminating solids are effectively removed from a liquid through arrangement of the filter media for circulation of the liquid to be filtered thereat in a manner that tends continually to keep the filter media functioning at a practicable level and that allows the filter media to be regenerated readily whenever operating conditions cause its functioning to drop below such a level periodically. The filtering system provided is adapted for use in either intermittently or continuously operating forms, and is of particular advantage in situations where the solids to be separated commonly present troublesome filter clogging difficulties, as where the solids are fibrous in character.

6 Claims, 5 Drawing Figures

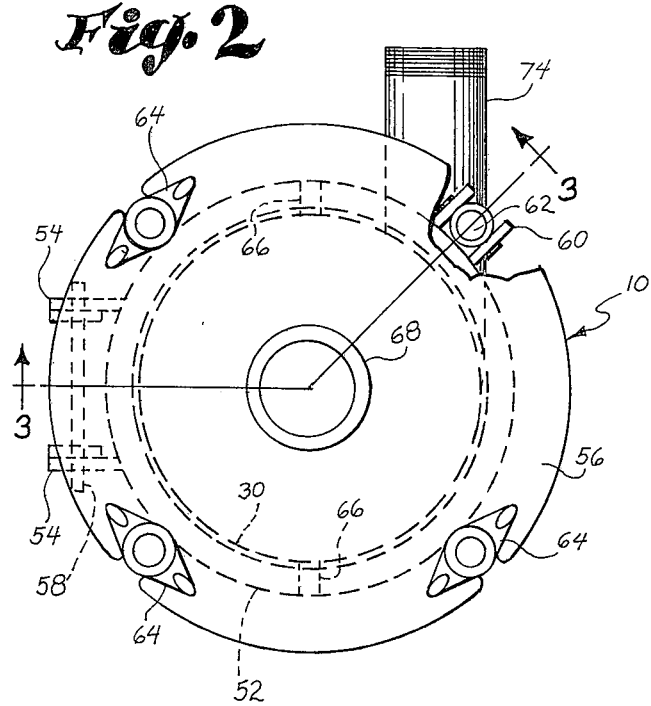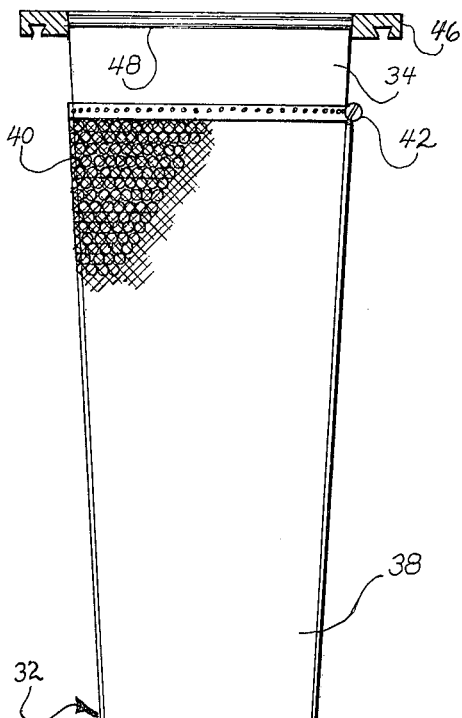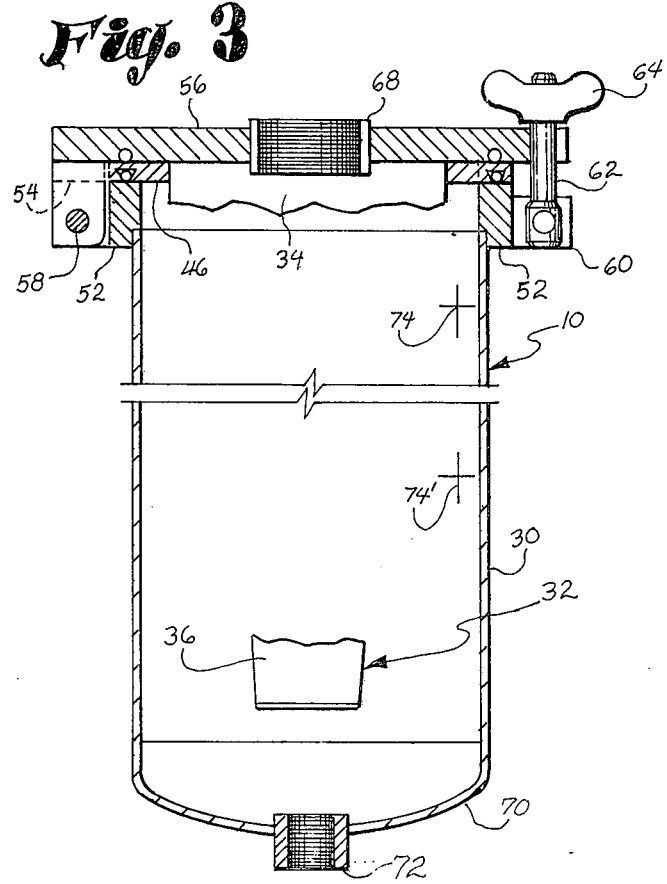

FILTERING APPARATUS AND PROCESS

BACKGROUND OF THE INVENTION

Textile wet processing operations where the textile material being treated is formed of spun yarn characteristically yield a spent treating liquor containing substantial concentration of fibrous waste commonly referred to as lint. It is often desirable, particularly when the spent liquor is aqueous, as in the case of effluent from a washing treatment, to recycle as much of the effluent as possible both to lessen the burden of controlling waste water disposal within acceptable standards and of reducing water consumption incident to wet processing. The lint content of wash water effluent or the like, however, has heretofore materially hampered attempts at recycling because of the difficulty inherent in removing the lint effectively enough in a practical way to condition the water satisfactorily for reuse.

The prior art has recognized the clogging characteristics of fibrous material in aqueous suspension or slurry form, as in U.S. Pat. No. 3,061,098 which deals with a screen classifier arranged to pass the fiber while screening off other undesirable solids. The art has dealt with special arrangements for clearing a filter screen of lint accumulations in particular circumstances, as in U.S. Pat No. 3,727,435 which arranges to direct the discharge from a domestic clothes washer so that it assists in freeing the wash cycle filter of lint. But insofar as we are aware, the problem of conditioning industrial quantities of lint-laden wash water practically for reuse has not previously been successfully solved.

SUMMARY OF THE INVENTION

The filter system of the present invention solves the foregoing problem effectively through use of a filter unit in which the filter media is arranged so that the liquid to be filtered can be circulated thereat in a continual filter cleaning fashion which tends to maintain the filter media functioning at a practicable level and provides for regenerating it readily whenever the filtering function falls below such a level.

Circulation of the liquid to be filtered is such that a predominant portion is continually returned through the filter unit to produce a filtered permeate amounting to 70 per cent or more of the feed while also tending to clear the filter media continually. Depending on the particular condition of the liquid being handled, the filter system can be used effectively in single unit form with periodic regeneration being employed, as necessary, to maintain the filtering function at a satisfactory level, or a multiple unit arrangement can be provided in which one unit of the multiple, in sequence, is always regenerating while the others are operating and a continuous output is maintained in this way.

Regeneration of the filter units is effected by closing them against filtered permeate output so that the filter media is subjected to the cleansing action of liquid circulation only at its active face. The filter media is preferably provided in elongate cartridge form and disposed within a cylindrical housing to leave an annular circulation space thereabout to which the feed of liquid to be filtered is delivered tangentially at a plurality of points spaced lengthwise of the elongate cartridge. In addition, when the liquid to be filtered contains heat values the filter system of the present invention lends itself well to arrangement for providing heat reclamation capability so as to enhance operating advantage further.

These and other features and advantages are described in greater detail below in connection with the accompanying drawings.

DESCRIPTION OF THE DRAWINGS

FIG. 2 is a plan view of a preferred form of filter structure adapted for use in accordance with the present invention;

FIG. 3 is a sectional detail taken substantially at the line 3—3 in FIG. 2;

FIG. 4 is an elevation of the filter cartridge employed in the unit shown in FIGS. 2 and 3.

DETAILED DESCRIPTION OF THE INVENTION

Figure 1:
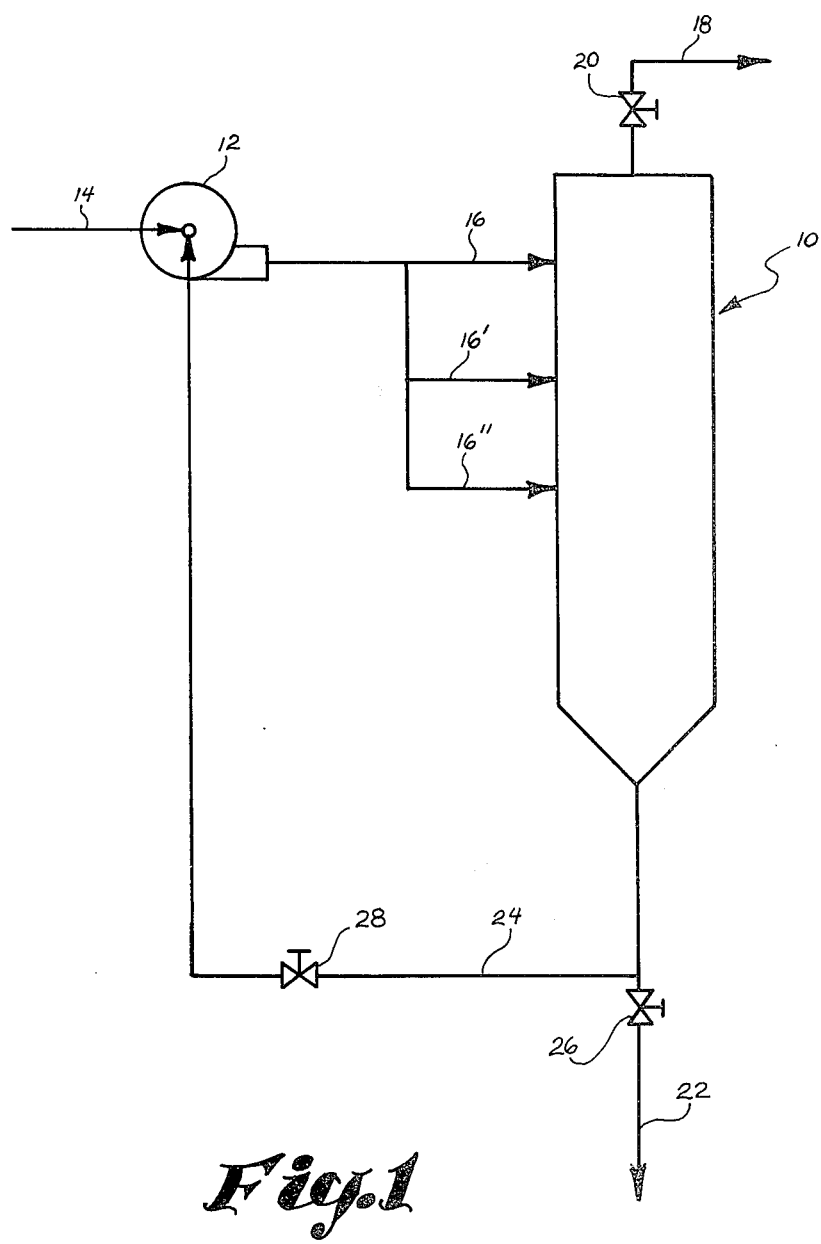
FIG. 1 is a schematic diagram of a representative single unit filter system embodying the present invention.

The single unit filter system diagramed in FIG. 1 employs a filter unit 10 to which liquid to be filtered is delivered by a pump 12 that receives the liquid through a line 14. The delivery line 16 from pump 12 preferably branches as indicated at 16' and 16'' so as to feed the filter unit 12 at a plurality of points for reasons that will appear presently. Filtered permeate leaves the unit 10 through a line 18 to be carried off for recycling, and this recovery line 18 is fitted with a valve at 20 so that it may be closed whenever regeneration of filter unit 10 is necessary. Unfiltered liquid is drained from filter unit 10 through a line 22 that branches at 24 for recirculating connection with pump 12, and drain line 22 is valved at 26 beyond such branching, as is the branch line at 28, so as to provide for controlling flow in these lines to force recirculation of a predominant portion of the unfiltered liquid during operation of the FIG. 1 filter system.

Representative operation of the FIG. 1 filter system involved handling aqueous effluent from a cotton sheeting wash treatment. The effluent was received by pump 12 at the rate of 25 gallons per minute, and pump 12 was operated to deliver at the rate of 100 gallons per minute and 30 p.s.i.g. through filter unit 10, with the drain and recirculating line valves 26 and 28 being set to force recirculation at the rate of 75 gallons per minute to pump 12. Under these conditions filtered permeate was recovered through line 18 for recycling at the rate of 20 gallons per minute, so that only 5 gallons per minute had to be dumped to waste.

Structurally, the filter unit 10 provided for systems of this sort is preferably arranged as illustrated in FIGS. 2, 3 and 4 with an elongate cylindrical housing 30 containing a tubular filter cartridge 32 disposed coaxially and substantially coextensively therein. The filter cartridge 32, which is proportioned in cross section to leave an annular circulation space thereabout within housing 30, advantageously has a lengthwise conical configuration from a design standpoint, although it can be provided in cylindrical form as well.

The cartridge body is formed compositely of imperforate top and bottom end sections 34 and 36 assembled, by seam welding or the like, with a perforate central section 38 forming a support for the filter media 40 which is secured in covering relation thereat by hose-type clamps 42 and 44. The top end section 34 is fitted with an annular flange 46 at which the filter cartridge 32 is supported and positioned in housing 30, and has a handle bar 48 arranged diametrically therein for use in installing and removing cartridge 32, while the bottom end section 36 is capped at 50 to complete the cartridge structure.

The cylindrical filter unit housing 30 carries a relatively heavy ring member 52 at its upper end on which a pair of spaced hinge lugs 54 are installed for mounting a housing lid 56 at a hinge pin 58, and at which additional lug pairs 60 are installed as pivot pin supports for eye bolts 62 that are fitted with wing nuts 64 to serve as closure clamps for housing lid 56. The housing ring 52 may be tapped as at 66 for fitting the filter unit with suitable relief protection (not shown), and housing lid 56 is centrally fitted at 68 for installation of the previously mentioned permeate recovery line 18 in communication with the interior of filter cartridge 32. At its lower end the housing 30 is closed by a dished bottom portion 70 that is also centrally fitted as at 72 for connection of the earlier noted drain line 22.

In addition, housing 30 is fitted as seen at 74 (and 74', for example) in FIGS. 2 and 3 for connection of the pump delivery lines by which the liquid to be filtered is fed to filter unit 10. The arrangement of these feed fittings 74 (and any others that are provided) is such as to deliver the liquid to be filtered tangentially into the annular circulation space provided within housing 30 about filter cartridge 32 so that a swirling, turbulent flow of the fed liquid is induced in this space which tends to prevent clogging accumulation of the liquidsuspended soilds at the adjacently exposed face of filter media 40.

The extent of clogging difficulty experienced at filter media 40 varies greatly with such factors as the nature of the liquid being filtered, the type and concentration of the solids to be separated, the character of any other materials carried by the liquid, and the form of the filter media itself. In dealing with textile wash water effluent to remove fibrous waste or lint therefrom, for which the filtering equipment of the present invention was particularly developed, it has been found that filter media consisting of stainless steel woven wire filter cloth or screening of about 325 mesh, when carefully selected and installed to present the greatest possible surface smoothness, produces the best all around results.

With filter media of this sort it is entirely feasible in some instances to operate with only one feed fitting 74 at filter unit 10, although it will usually be desirable to provide at least two feed fittings as at 74 and 74' in FIG. 3, and in single unit systems three, or even more, feed fittings as indicated in FIG. 1 are helpful. The ultimate arrangement would be a slotted delivery manifold arranged lengthwise of housing 30 to introduce the liquid feed in a sheet related to the length of cartridge 32. The objective in any case is to provide a flow through the filter unit 10 of sufficient velocity and consequent turbulence to combat the filter clogging tendency of the solids being removed. When this tendency is severe, as with solids of fibrous character, the use of multiple feed fittings allows velocity and turbulence to be sustained at a more nearly uniform level through the entire course of circulation in the filter unit and thereby maintain the filter media functioning at much better advantage than is otherwise possible. One feed fitting 74 is always located to deliver adjacent the upper end portion of filter media 32 and any other feed fittings employed are spaced lengthwise of housing 30 to obtain the velocity sustaining effect suitable in relation to the particular structural configuration of the filter unit being used. In the embodiment of FIGS. 2, 3 and 4, the cylindrical housing 30 was provided in a 40-inch length and 8-inch inner diameter for a filter cartridge tapering from a 6 ¾-inch diameter, and the second feed fitting at 74' was spaced 18 inches below the upper feed fitting 74.

Figure 5:
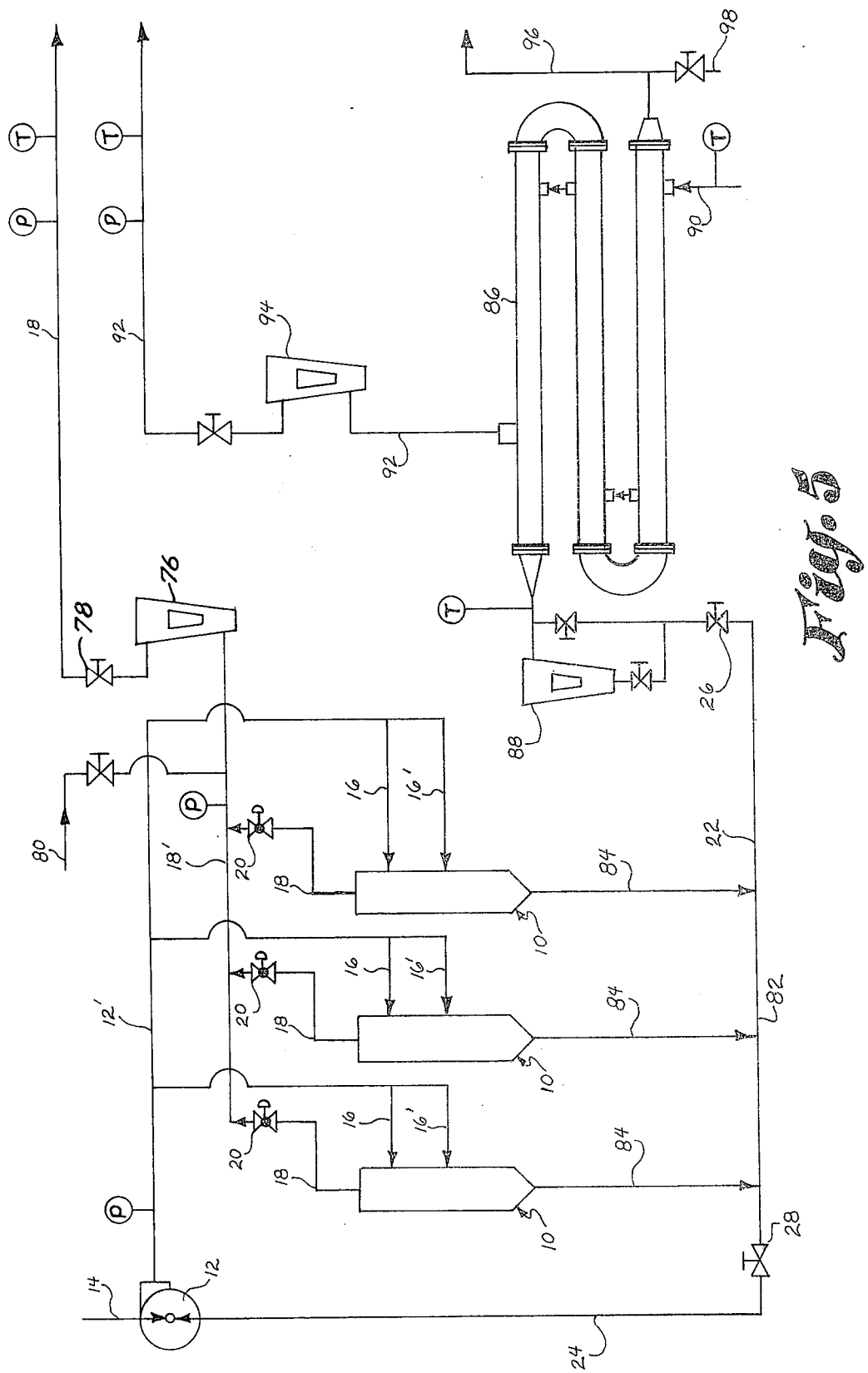
FIG. 5 is a schematic diagram of a multiple unit filter system embodying the present invention and incorporating heat reclamation capability.

FIG. 5 diagrams a multiple unit filter system employing three filter units 10 of the form just described as provided for continuous operation in handling aqueous effluent from a cotton sheeting washer range and for recovering heat from the effluent being handled which was received at the system pump 12 through line 14 at a rate of 100 gallons per minute and a temperature of 185°F. The pump 12 was arranged in this instance to deliver through a common header 12' from which each of the filter units 10 were fed at multiple points 16 and 16'. Likewise, the filter unit recovery lines 18 containing valves 20 were connected with a common manifold 18' running through a flow meter 76 and valve 78 to carry off the filtered permeate for reuse at the washer range. An emergency make-up line 80 was also connected with manifold 18' to provide an alternative washer range supply in the event operation of the filter system was interrupted for any reason. In addition, a further common manifold 82 was provided to receive discharge of unfiltered liquid through lines 84 from each of the filter units 10, while drain line 22 containing throttle valve 26 and recirculation line 24 running to pump 12 and containing valve 28 were both connected with this manifold 82.

Operation of this portion of the FIG. 5 system was comparable to that previously described in forcing recirculation of a predominant portion of the unfiltered liquid so as to produce a high percentage of filtered permeate recovery from the feed. The operation differed significantly, however, in that the recovery line valves 20 were manipulated to close the recovery lines 18 in timed sequence so that one of the filter units 10 was always regenerating, through the cleansing action of circulation therethrough only at the active filter media face, while the other two filter units 10 continued in operation. Under these circumstances it proved possible to recover filtered permeate continuously from the feed at the rate of 70 gallons per minute. Manipulation of the recovery line valves in the foregoing manner can be done manually or a monitoring control can be provided to effect the manipulation automatically as will usually be desirable for mill scale operations.

Because of the heat contained in the wash water effluent being handled, the FIG. 5 filter system was also designed to recover the portion of this heat that would otherwise be lost with the drainage dump, and for this purpose the drain line 22 was arranged to run to a heat exchanger 86 with a flow meter by-pass 88 provided thereat to check the drainage flow as a basis for balancing a countercurrent make-up supply through heat exchanger 86 at an amount sufficient to bulk the filtered permeate recovery to equality with the system feed or, stated otherwise, at an amount equal to the drainage flow which was 30 gallons per minute in the instance being described. A line 90 was arranged at heat exchanger 86 for introducing the make-up supply and an exit line 92 was provided for carrying it off to the washer range through a flow meter 94. As the system feed had been received at 185°F. and the drainage flow reached heat exchanger 86 at substantially this same temperature, it proved possible to raise the temperature of make-up water supplied at about 60°F. to about 150°F. for delivery to the washer range which, together with return of the filter permeate at substantially the initial effluent temperature, produced a material reduction in wash water heating requirements at the washer range.

The drainage flow left heat exchanger 86 through a discharge line 96 at which a valved take-off tap 98 was provided for sampling purposes and which, together with suitably located pressure and temperature gauges as indicated, completed the system. It should perhaps be additionally noted, however, that the make-up supply exit line 92 was arranged to deliver separately from the filtered permeate recovery lin 18' because it was desirable to provide for applying the cleaner make-up water to the cloth last at the washer range, but that unless some reason of this sort exists the make-up exit line 92 could as well join the permeate recovery line 18' to provide a system output equal to the feed.

The present invention has been described in detail above for purposes of illustration only and is not intended to be limited by this description or otherwise to exclude any variation or equivalent form or procedure that would be apparent from, or reasonably suggested by, the foregoing disclosure to the skill of the art.

We claim:

1. Apparatus for filtering contaminating solids and reclaiming heat from a heated aqueous effluent in the course of conditioning the effluent in substantial part for reuse, said apparatus comprising a plurality of filter units each of which comprises an elongate cylindrical housing having a tubular filter cartridge disposed in fixed relation coaxially and substantially coextensively therein and proportioned in cross section to leave an annular circulation space about said cartridge within said housing, means for supplying said effluent continuously to said filter units in parallel, said supply means being arranged for delivering effluent tangentially into said circulation space at a plurality of points spaced lengthwise of the housing of each filter unit, means for carrying off filtered effluent from the outlet side of each filter unit of said plurality, means for recirculating residual unfiltered effluent from the inlet side to said filter unit supply means which comprises a drain line from each filter unit connected to a common manifold having a recirculating line running therefrom to said filter unit supply means and having a common drain line fitted thereat, said common drain line being valved for throttling to force recirculation of a predominant portion of unfiltered effluent draining from said circulation space, means for selectively closing the means for carrying off filtered effluent from the filter units of said plurality so that any of said filter units may be regenerated by the cleansing action of effluent circulation therethrough only at said inlet side while the remainder of said filter unit plurality continues in operation, and a heat exchanger, together with means for supplying clear aqueous make-up through said heat exchanger, and means for bleeding a corresponding portion from said recirculating effluent through said heat exchanger in heat exchange relation with said make-up supply.

2. Apparatus as defined in claim 1 wherein said heated aqueous effluent is derived from a textile wet processing operation and the contaminating solids to be filtered therefrom are fibrous in character, and wherein said filter units are equipped with filter media comprising filter screening in the order of 325 mesh.

3. The method of filtering contaminating solids from a heated aqueous effluent comprising the steps of supplying said liquid continuously to a plurality of filter units in parallel, each of said filter units comprising an elongate cylindrical housing having a tubular filter cartridge disposed in fixed relation coaxially and substantially coextensively therein and proportioned in cross-section to leave an annular circulation space about said cartridge within said housing at which said liquid is supplied tangentially, carrying off filtered liquid from the outlet side of all but one of the filter units of said plurality, recirculating unfiltered liquid from the inlet side of all filter units of said plurality to said liquid supply, sequentially alternating the filter unit of said plurality from which no filtered liquid is carried off so that all of the filter units are periodically regenerated by the cleansing action of liquid circulation therethrough only at said inlet side while the remainder of said filter unit plurality continues in operation, and supplying clear aqueous make-up in an amount sufficient to bulk the filtered effluent carry-off to equality with the supplied effluent while first passing the make-up supply in heat exchange relation with a corresponding amount of unfiltered effluent bled from said filter units for this purpose.

4. The method defined in claim 3 wherein said liquid is supplied to each of said filter units at a plurality of points spaced lengthwise of the housing for sustaining circulation velocity therethrough.

5. The method defined in claim 3 wherein said heated aqueous effluent is derived from a textile wet processing operation and the contaminating solids to be filtered therefrom are fibrous in character, and wherein the filtered effluent carry-off is delivered for reuse separately from said make-up supply.

6. The method defined in claim 5 wherein said textile wet processing operation is a washing treatment and the textile material being washed is formed of spun yarn.

\* \* \* \* \*